Dec. 16, 1958  G. E. HENNING  2,864,126
PLASTICS EXTRUSION APPARATUS
Filed Nov. 8, 1954

INVENTOR.
G. E. HENNING
BY
ATTORNEY

United States Patent Office 2,864,126
Patented Dec. 16, 1958

2,864,126

PLASTICS EXTRUSION APPARATUS

George E. Henning, Baltimore, Md., assignor to Western Electric Company, Incorporated, New York, N. Y., a corporation of New York Application November 8, 1954, Serial No. 467,444

5 Claims. (Cl. 18—13)

This invention relates to apparatus for extruding plastics, and more particularly to apparatus for extruding plastic sheaths onto filamentary cores.

The insulated electrical conductors utilized in the communications industry are required to possess uniformity in electrical and physical characteristics. In extruding a layer of plastic insulation onto a filamentary conductive core to produce such a conductor, particular care must be taken to insure that the layer of insulation is concentric with respect to the core in the extruded product. Variations in the wall thickness of the insulation must be controlled closely to achieve concentricity and uniformity.

One of the principal causes of failure to achieve these objectives is the existence of unbalanced flow conditions in the plastic at the time it is flowing onto the filamentary conductive core inside the extruder. When the plastic is simultaneously being extruded and expanded into a cellular structure containing a multiplicity of minute, gas filled cells, the problems created by unbalanced flow conditions become magnified to an even greater extent. In the past, various structures have been proposed for achieving balanced flow conditions inside the extruder but difficulties have still been encountered in extruding concentric and uniform products.

An object of this invention is to provide new and improved apparatus for extruding plastics.

Another object of the invention is to provide new and improved apparatus for extruding plastic sheaths onto filamentary cores.

An apparatus illustrating certain features of the invention may include a cylindrical extrusion bore through which a plastic compound is advanced under pressure, an extrusion head secured to the delivery end of the bore and having an internal chamber therein, and an extrusion die mounted at one end of the chamber, said head being provided with a plurality of flow paths through which the compound flows from the chamber to the die to restrict the flow of the plastic compound and including a plurality of small radial passages, the material flowing in each of the flow paths being under substantially the same pressure when it reaches the die.

A complete understanding of the invention may be obtained from the following detailed description, when considered in conjunction with the accompanying drawings, in which.

Extruders employed commercially for the production of insulated conductors are usually of the cross-head type. In this type of extruder, a stock screw is mounted rotatably within a cylindrical bore, and an extrusion head having a die therein is mounted transversely across the delivery end of the bore. A plastic insulating compound being advanced through the bore towards the die by the stock screw is forced to change its direction of flow 90° in passing from the delivery end of the bore to the die. Extruders of this cross-head type inherently present the problem of compensating for unbalanced flow conditions caused by the 90° bend in the flow of the plastic compound.

Figure 1:
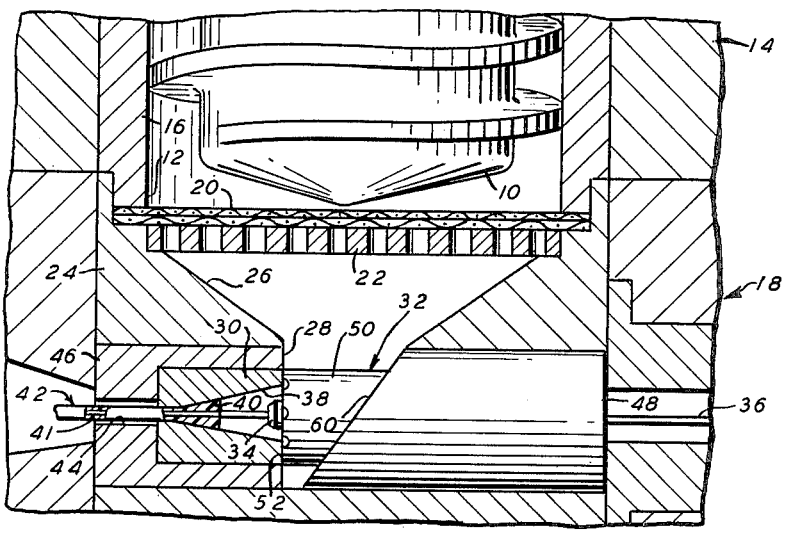
Fig. 1 is a fragmentary, horizontal section of an apparatus forming one embodiment of the invention.
Figure 2:
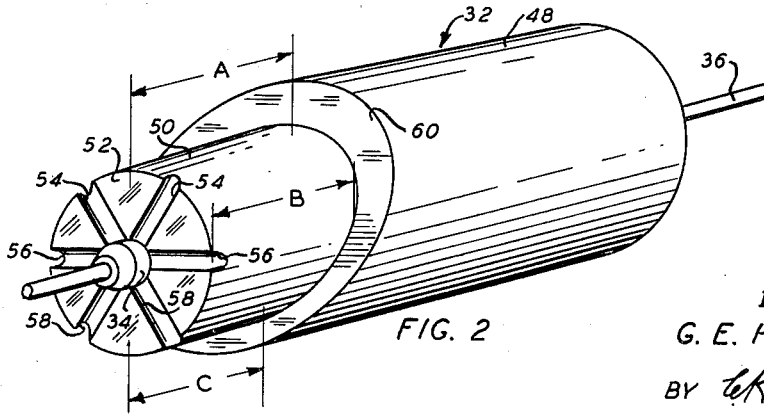
Fig. 2 is an enlarged perspective view of a portion of the apparatus shown in Fig. 1.

A typical cross-head extruder, modified in accordance with the invention, is illustrated in Figs. 1 and 2. A stock screw 10 is disposed longitudinally and mounted rotatably within a cylindrical bore 12 of an extrusion cylinder 14 having an inner liner 16. Power driven means (not shown) is provided for positively rotating the stock screw 10 to advance a mass of plastic insulating compound through the bore 12 towards the delivery end thereof. An extrusion head 18 is secured at the delivery end of the bore 12. A straining screen 20 and a backing plate 22 are mounted transversely across the delivery end of the bore 12 and supported within the head 18. The screen 20 strains out any lumps or foreign particles in the plastic compound, and it also performs a kneading action on the compound.

The extrusion head 18 is provided with a cylindrical, centrally apertured block 24 having a tapered passageway 26 through which the plastic compound flows after it leaves the backing plate 22. The passageway 26 diminishes gradually in cross-section as it leads from the extrusion bore 12 to a chamber 28 formed in the interior of the block 24. An extrusion die 30 is mounted at the left hand end of the chamber 28, as viewed in Fig. 1, and a core tube holder 32 is mounted at the right hand end of the chamber 28. A core tube 34 is mounted in the holder 32 in axial alignment with the die 30 for the purpose of guiding an advancing filamentary core 36 into the die 30.

During the operation of the extruder, the filamentary core 36 is advanced continuously through the extrusion head 18, from right to left as viewed in Fig. 1. The core 36 passes through a tapered passageway 38, which extends axially through the die 30 and gradually decreases in cross-sectional area towards the exit end of the die 30. In the passageway 38 a mass 40 of plastic insulating compound is formed continuously into a tubular sheath 41 encasing the advancing core 36, thereby resulting in the production of an insulated conductor 42.

After it issues from the exit end of the die 30, the insulated conductor 42 passes through a passageway 44, which passageway extends axially through a die holder 46 in which the die 30 is supported with its passageway 38 in alignment with the passageway 44. Sufficient clearance exists between the conductor 42 and the surrounding wall of the passageway 44 to prevent physical contact between these members. Beyond the die holder 46, the insulated conductor 42 is advanced through cooling means (not shown), such as a water trough, and thence to a capstan (not shown) which provides the pulling force needed to advance the core 36 through the extruder.

The specific configurations of the die 30, the core tube holder 32 and the core tube 34 are designed to equalize the flow of the plastic compound by the time it impinges upon the advancing core 36 circumferentially thereof. The core tube holder 32 comprises a main body portion 48 and a cylindrical portion 50, which is reduced in diameter as compared to the main body portion 48. The cylindrical portion 50 extends entirely through the chamber 28 and terminates in a transversely flat face 52 having a plurality of pairs of radial grooves 54—54, 56—56 and 58—58 therein, equally spaced around the periphery of the face. The grooves 54—54 are the closest ones to the stock screw 10, and the grooves 58—58 are the ones most distant from the stock screw. The grooves 56—56 are intermediate the position of the grooves 54—54 and the position of the grooves 58—58. Each of the grooves in each of the pairs of grooves are positioned equal distances from the stock screw 10. The core tube 34 protrudes from the axial center of the flat face 52, and the grooves extend radially outward from the core tube 34. The flat face 52 is in abutting contact with the die 30 around the entrance end thereof, and thereby blocks the flow of the plastic compound into the die except through the grooves in the flat face 52.

In the embodiment of the invention illustrated in Figs. 1 and 2 the flat face 52 is provided with six of the grooves 54—54, 56—56 and 58—58, spaced 60° apart around the periphery of this face. Substantially the same results could be obtained by providing the face 52 with only four grooves spaced 90° apart, or two grooves spaced 180° apart. In each case each of the grooves in each of the pairs of grooves should be positioned equidistant from the stock screw 10 and the extrusion bore 12.

In flowing from the stock screw 10 to the die 30, the plastic compound traverses a longer path when it flows around the cylindrical portion 50 of the core tube holder 32 and thence through the grooves 58—58, than it does when it flows through the grooves 54—54 to enter the die 30. Of course, the distance traversed by the compound in flowing to the grooves 56—56 is intermediate that traversed in flowing to the grooves 54—54 and 58—58. As a result of the differences in the distances traversed by the plastic compound to reach different portions of the circumference of the core 36 inside the die, the pressures and the rates of flow may be different in the different grooves.

In order to compensate for the different distances traversed by the plastic compound to reach the core 36 through the plurality of grooves on the face 52, the juncture of the reduced cylindrical portion 50 of the core tube holder 32 with the main body portion 48 thereof is defined by an inclined, oval face 60. The core tube holder 32 is mounted within the block 24 in the extrusion head 18 in such manner that the oval face 60 is properly positioned with respect to the stock screw 10 to equalize the flow through the grooves 54—54, 56—56 and 58—58. In order to reach these grooves, the plastic compound must flow through the chamber 28. The die holder 46, the cylindrical portion 50 of the core tube holder 32, and the oval face 60 form boundaries for the chamber 28. As a result of this arrangement, the chamber 28 is annular in cross section, and it tapers gradually to a smaller volume on the side most distant from the stock screw 10.

Due to the annular tapered shape of the chamber 28, substantially equal amounts of the plastic compound can flow into each of the grooves 54—54, 56—56 and 58—58. The volume of the flow path through the chamber 28 to reach the grooves 54—54 is approximately equal to the volume of the flow path to the grooves 58—58. To reach this result, the plane in which the oval face 60 lies is so chosen that the distances along the portion 50 of the core tube holder 32 from different portions of the flat face 52 to the oval face 60 are related in certain fixed proportions. As shown in Fig. 2, the distance A along the portion closest to the stock screw 10 and the extrusion bore 12 is approximately three times as large as the distance C along the portion most distant therefrom, and the distance B along the center of the portion 50 of the core tube holder 32 is approximately twice as large as the distance C. The effect of this construction is to achieve uniform velocity in the plastic compound as it flows into each of the grooves 54—54, 56—56 and 58—58. It is important to achieve uniform velocity in the compound at this time in order to have the compound be uniform in plasticity as it converges upon the advancing core 36 circumferentially thereof.

Apparatus embodying the invention is highly useful for continuously forming a plastic sheath upon a filamentary core of great length. Specifically, the core may be a highly conductive wire, such as a copper-clad steel wire, and the sheath may be composed of solid polyethylene. In some cases the insulation extruded onto the conductive core is composed of cellular polyethylene formed by gas-expanding normally solid polyethylene during the extrusion operation. Another type of sheathed core for which the invention is particularly advantageous, is video string comprising a core composed of fiber glass strands and a sheath thereon composed of cellular polyethylene.

In the extrusion of a sheath of cellular polyethylene upon a filamentary conductive core, a heat-decomposable blowing agent, such as a powdered form of a dinitroso pentamethylene tetramine or a suitable sulfonyl hydrazide, may be uniformly distributed upon granules of the commercially available polymers of ethylene which are to be extruded. At the die a suitable high temperature is maintained to facilitate continuous extrusion of the polymer and to insure the formation of gas by heat decomposition of the blowing agent. A convenient length of the moving core may be preheated prior to its entry into the extruder, in order to prevent the conductive core from chilling the extruded mass and thereby inhibiting the action of the blowing agent. The extruded layer of insulation expands after leaving the extrusion die, due to the decomposition of the blowing agent into a gaseous product, which forms minute, uniformly distributed, discrete, gas filled cells throughout the polyethylene sheath. The extruded product formed in this manner is characterized by uniformity in size, composition and electrical properties.

In the production of video string very little tension can be placed upon the fiber glass stranded core being sheathed with cellular polyethylene. An effort is made to advance this core through the extruder at the same rate at which the plastic compound is being extruded. However, it requires delicate adjustment to make the speed of the core equal the speed of the sheath, and at times the extruding sheath may actually tend to move the core through the extruder faster than the takeup capstan is operating. It is evident that under such operating conditions the core can readily be pushed off-center by the plastic compound as it moves through the die. Consequently, in this case it is particularly important to equalize the pressure in the streams of flowing plastic compound which converge upon the advancing core within the die.

This embodiment of the invention functions to break up the mass of plastic compound flowing through the passageway 26 and the chamber 28 into a plurality of flow paths in which the compound is under substantially the same pressure, and which cause the compound to flow through the different grooves in the flat face 52 at the same velocity. The thin streams of compound flowing through the grooves are equidistantly distributed circumferentially of the advancing filamentary core 36. Beyond the tip of the core tube 34 the converging streams impinge radially upon the core 36, and the pressure of the compound on the core is substantially equal all around the core. These streams are continuously shaped by the die 30 into a unitary tubular sheath covering the core 36. Due to the drop in pressure on the covered core as it issues from the die 30 into the atmosphere, the sheath becomes expanded and it is transformed into its cellular form. At this time the pressure inside the extruder may exceed 6,000 pounds per square inch. Since apparatus embodying the invention causes the pressure inside the extruder to be equalized in the area immediately around the advancing core, the gas-filled cells in all portions of the expanded sheath are approximately equal in size and in number, and the plastic sheath is uniform in thickness and in composition.

Alternative modification

Figures 3, 4:
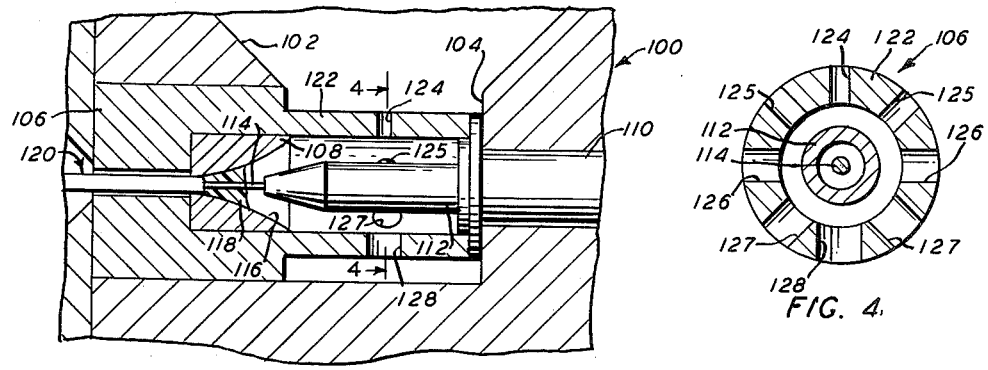
Fig. 3 is a fragmentary, horizontal section of an apparatus forming a second embodiment of the invention.
Fig. 4 is a vertical section taken along line 4—4 of Fig. 3.

The extruder illustrated in Fig. 3 is also of the cross head type, and it is provided with a stock screw (not shown) similar to the stock screw 10 shown in Fig. 1. An extrusion head 100 is mounted transversely across the delivery end of an extrusion cylinder (not shown) similar to the extrusion cylinder 14. The extrusion head 100 is provided with a tapered passageway 102 communicating with a chamber 104 formed in the interior of the extrusion head. At one end of the chamber 104, a die holder 106 supports an extrusion die 108. A core tube holder 110 is mounted at the other end of the chamber 104 within the extrusion head 100. The core tube holder 110 supports a core tube 112 in axial alignment with the die 108.

A continuously advancing filamentary core 114, such as a copper-clad steel wire, is guided by the core tube 112 into a tapered passageway 116 which extends axially through the die 108. In the passageway 116 the advancing core 114 is continuously sheathed by a mass 118 of plastic insulating compound, such as polyethylene, to produce an insulated conductor 120. A suitable cooling means (not shown) positioned just beyond the die 108 lowers the temperature of the sheath on the insulated conductor 120 immediately after it issues from the die 108. This cooling action causes the plastic sheath on the conductor 120 to become solidified before it comes into engagement with a capstan (not shown), which pulls the core 114 through the extruder.

A hollow cylindrical portion 122 of the die holder 106 protrudes into the chamber 104 and surrounds the core tube 112 in concentric spaced relation thereto. This cylindrical portion 122 contains a plurality of radial apertures 124, 125—125, 126—126, 127—127 and 128 located at equal intervals around its periphery. The aperture 124 is closest to the stock screw, while the aperture 128 is most distant therefrom. The apertures 126—126 are aligned on opposite sides of the cylindrical portion 122 of the holder 106, and are positioned equal distances from the stock screw. The distance from the stock screw to the apertures 125—125 is halfway between the distance to the aperture 124 and the distance to the apertures 126—126. Similarly, the distance to the apertures 127—127 is intermediate that of the apertures 126—126 and of the aperture 128.

In order to reach the advancing core 114, the plastic compound flows from the passageway 102 into the chamber 104, and thence through each of the apertures radially towards the core tube 112. In flowing through the apertures, the plastic compound is split into a plurality of small streams equidistantly distributed circumferentially around the core tube. These small streams of the plastic compound converge as they flow along the core tube 112 and impinge upon the advancing core 114 within the die 108, which shapes the converging streams into a tubular sheath on the core 114.

In order to equalize the flow of the plastic compound through the apertures 124, 125—125, 126—126, 127—127 and 128, it is necessary to compensate for the different distances the compound traverses from the stock screw to reach the apertures. This is accomplished by making the aperture largest on the side of the die holder 106 most distant from the stock screw, and making the other apertures proportionately smaller. As shown in Figs. 3 and 4, the largest aperture is the aperture 128, and this aperture is most distant from the passageway 102 into which the stock screw delivers the plastic compound. The aperture 124 is smallest and it is closest to the stock screw. The other apertures are proportionately intermediate in size and in distance from the stock screw.

In both embodiments of the invention, the flow of the plastic compound is restricted to a plurality of small streams in which equal volumes of the compound flow radially towards the advancing core. This result is accomplished by providing a plurality of flow paths through different portions of the chamber in the extrusion head, in which paths the compound flows in substantially the same volume to equalize the pressure of the compound in the area immediately surrounding the advancing core. The plasticity, and consequently the consistency of the plastic compound, is thereby made uniform circumferentially around the core, resulting in a concentric and uniform extruded product.

It is to be understood that the above-described structures are simply illustrative of the application of the principles of the invention. Numerous other arrangements which embody the principles of the invention and fall within the spirit and scope thereof may be readily devised by persons skilled in the art.

What is claimed is:

1. Apparatus for extruding plastic sheaths onto filamentary cores, which comprises a cylindrical extrusion bore through which a plastic compound is advanced under pressure, an extrusion head secured transversely across the delivery end of the bore and having an internal chamber in communication with the bore, an extrusion die mounted at one end of the chamber, a core tube holder mounted in the head, and a core tube supported by the holder in axial alignment with the die for guiding an advancing filamentary core through the chamber and into the die, said holder having a cylindrical portion extending through the chamber and terminating in a transversely flat face which abuts the die, said flat face having a plurality of radial passages extending directly from the chamber which restrict the flow of the plastic compound into the die to a plurality of small radial streams converging upon the advancing core to form a sheath thereon in the die, said chamber and passages being compensated so as to equalize the pressure of the plastic compound circumferentially around the core as it passes through the die.

2. Apparatus for extruding plastic sheaths onto filamentary cores, which comprises a cylindrical extrusion bore, means for advancing a plastic compound under pressure through the bore, an extrusion head secured transversely across the delivery end of the bore, said head having an internal chamber in communication with the bore and tapering to a smaller size on the side of the head most distant from the extrusion bore, an extrusion die mounted at one end of the chamber, a core tube holder mounted in the head and extending through the chamber, and a core tube supported by the holder in axial alignment with the die for guiding an advancing filamentary core through the chamber and into the die, said holder having a cylindrical portion in the chamber terminating in a transversely flat face in abutting contact with the die, said flat face having a plurality of radial grooves extending directly from the chamber which restrict the flow of the plastic compound into the die to a plurality of small radial streams converging upon the advancing core to form a sheath thereon in the die, whereby said tapered chamber and said grooves together form continuous flow paths in which the compound is under substantially the same pressure to equalize the pressure circumferentially around the core.

3. Apparatus for extruding plastic sheaths onto filamentary cores, which comprises a cylindrical extrusion bore, a stock screw mounted rotatably in the bore for advancing a plastic compound under pressure through the bore, an extrusion head secured transversely across the delivery end of the bore, said head having an internal chamber in communication with the bore and tapering to a smaller volume on the side of the head most distant from the extrusion bore, an extrusion die mounted at one end of the chamber, a core tube holder mounted in the head at the opposite end of the chamber and forming one wall thereof, said holder having a cylindrical portion extending entirely through the chamber and terminating in a transversely flat face in abutting contact with the die, and a core tube supported in the center of said wall in axial alignment with the die for guiding an advancing filamentary core through the chamber and into the die, said flat face having a plurality of small radial grooves extending directly from the chamber through which the plastic compound flows into the die in a plurality of restricted streams converging upon the advancing core, whereby said tapered chamber and said grooves together form continuous flow paths in which the compound is under substantially the same pressure to equalize the pressure circumferentially around the core.

4. Apparatus for extruding plastic sheaths onto filamentary cores, which comprises a cylindrical extrusion bore through which a plastic compound is advanced under pressure, an extrusion head secured transversely across the delivery end of the bore and having an internal chamber in communication with the bore, a die holder mounted at one end of the chamber and having a hollow cylindrical portion extending into the chamber, an extrusion die supported in the die holder, a core tube holder mounted at the opposite end of the chamber, and a core tube supported in the core tube holder and projecting into the hollow cylindrical portion of the die holder in axial alignment with the die for guiding an advancing filamentary core through the chamber and into the die, said cylindrical portion of the die holder being provided with a plurality of radial apertures extending directly from the chamber and converging on the core tube to restrict the flow of plastic compound into the die to a plurality of radial streams converging on the advancing core, whereby the pressure of the plastic compound is substantially equalized in the area immediately surrounding the core as it passes through the die.

5. Apparatus for extruding plastic sheaths onto filamentary cores, which comprises a cylindrical extrusion bore, a stock screw mounted rotatably in the bore for advancing a plastic compound under pressure through the bore, an extrusion head secured transversely across the delivery end of the bore and having an internal chamber in communication with the bore, a die holder mounted at one end of the chamber and having a hollow cylindrical portion extending entirely through the chamber, a core tube holder mounted at the opposite end of the chamber, and a core tube supported in the core tube holder and projecting into the chamber in axial alignment with the die for guiding an advancing filamentary core through the chamber and into the die, said core tube projecting into the hollow cylindrical portion of the die holder, said cylindrical portion of the die holder being provided with a plurality of radial apertures converging on the core tube to restrict the flow of plastic compound into the die to a plurality of radial streams converging on the advancing core, said apertures being graduated in size from a small aperture on the side of the head closest to the extrusion bore to a large aperture on the side of the head most distant from the bore, whereby said chamber and said graduated apertures together form continuous flow paths to equalize the pressure of the plastic compound circumferentially around the core as it passes through the die.

References Cited in the file of this patent

UNITED STATES PATENTS

| 2,199,209 | Stafford | Apr. 30, 1940 |
| 2,401,551 | Cook | June 4, 1946 |
| 2,511,986 | Martin | June 20, 1950 |
| 2,766,480 | Henning | Oct. 16, 1956 |

FOREIGN PATENTS

| 624,699 | Great Britain | June 15, 1949 |
| 649,873 | Great Britain | Feb. 7, 1951 |